United States Patent
Randazzo et al.

[11] Patent Number: 5,929,756
[45] Date of Patent: Jul. 27, 1999

[54] METHOD AND APPARATUS FOR DETECTING THE PRESENCE OF AN AT LEAST PARTIALLY DEFLATED TIRE ON A MOTOR VEHICLE

[75] Inventors: Cristina Randazzo, Castelnuovo Don Bosco; Stefano Re Fiorentin, Grugliasco; Fulvio Cascio, Pianezza, all of Italy

[73] Assignee: Fiat Auto S.p.A., Torino, Italy

[21] Appl. No.: 08/974,105

[22] Filed: Nov. 19, 1997

[30] Foreign Application Priority Data

Nov. 20, 1996 [IT] Italy .................................. TO96A0938

[51] Int. Cl.$^6$ .................................................. B60C 23/00
[52] U.S. Cl. ........................ 340/444; 340/671; 73/146.2; 701/29; 702/140
[58] Field of Search ..................... 340/442, 444, 340/671; 73/146.2–146.5; 701/29; 702/140

[56] References Cited

U.S. PATENT DOCUMENTS

| | | | |
|---|---|---|---|
| 5,239,469 | 8/1993 | Walker et al. | 340/444 |
| 5,345,217 | 9/1994 | Prottey | 340/444 |
| 5,591,906 | 1/1997 | Okawa et al. | 340/444 |
| 5,670,716 | 9/1997 | Tamasho et al. | 340/444 |

FOREIGN PATENT DOCUMENTS

| | | |
|---|---|---|
| 0552827 | 7/1993 | European Pat. Off. . |
| 0656268 | 6/1995 | European Pat. Off. . |
| 0712740 | 5/1996 | European Pat. Off. . |
| 58-188704 | 11/1983 | Japan . |
| 2270167 | 3/1994 | United Kingdom . |

*Primary Examiner*—Daniel J. Wu
*Attorney, Agent, or Firm*—Sughrue, Mion, Zinn, Macpeak & Seas, PLLC

[57] ABSTRACT

The method of detecting a partially deflated tire includes the steps of detecting the angular velocity of each wheel and generating corresponding velocity signals or data, processing the velocity signals or data in a processing unit arranged for calculating the value of a predetermined function of the ratio or of the difference between the product of the angular velocities of two diagonally opposed wheels and the product of the angular velocities of the other two wheels, and generating a warning signal when the difference between the values of this function and a first static reference value corresponding to a normal inflation condition of the tires exceeds a predetermined value, or when the difference between the values of this function and a second reference value determined upon each departure of the motor vehicle and corresponding to the actual inflation condition of the tires upon departure of the motor vehicle exceeds a predetermined value.

12 Claims, 1 Drawing Sheet

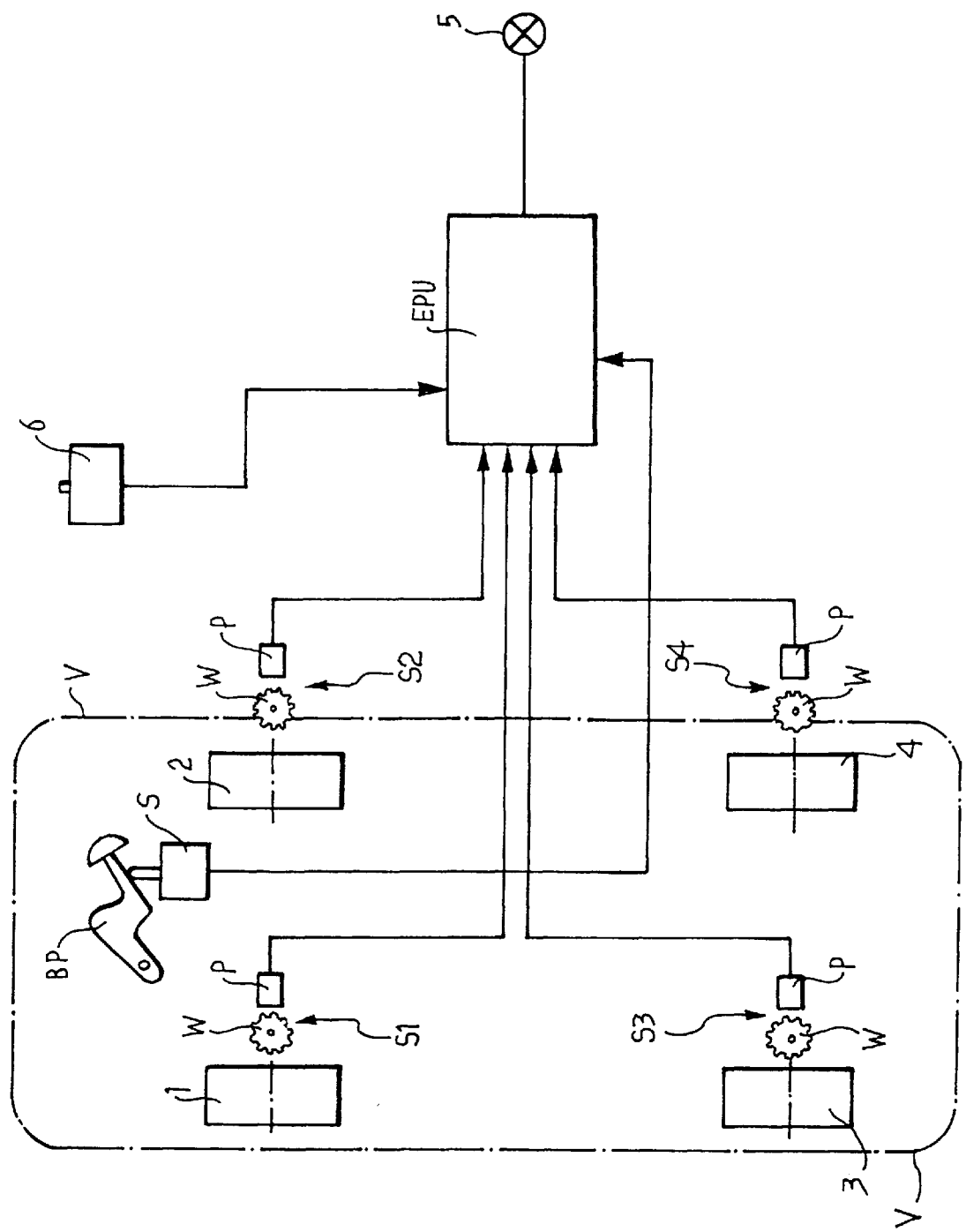

METHOD AND APPARATUS FOR DETECTING THE PRESENCE OF AN AT LEAST PARTIALLY DEFLATED TIRE ON A MOTOR VEHICLE

BACKGROUND OF THE INVENTION

The present invention relates to a method of detecting the presence of at least one at least partially deflated tire on a motor vehicle having four wheels.

SUMMARY OF THE INVENTION

The method according to the invention is characterized in that it comprises the steps of:

detecting the angular velocity of each wheel and generating corresponding velocity signals or data, and processing the velocity signals or data in processing means arranged for calculating values of a predetermined function of the ratio or of the difference between the product of the angular velocities of two diagonally opposed wheels and the product of the angular velocities of the other two wheels, and generating a warning signal when the difference between the values of the function and of a first (static) reference value corresponding to a normal inflation condition of the tires exceeds a predetermined value, or when the difference between the values of the function and of a second reference value determined upon each departure of the motor vehicle and corresponding to the actual inflation condition of the tires upon departure of the motor vehicle exceeds a predetermined value.

According to a further characteristic, the method according to the invention also comprises the steps of:

processing the velocity signals or data in the processing means in order to calculate values of a (first) index in accordance with a predetermined function of the changes in the relative rolling radius of each wheel, and generating a warning signal when the difference between the calculated values of this index and of a predetermined reference value exceeds a predetermined level.

BRIEF DESCRIPTION OF THE DRAWINGS

Further characteristics and advantages of the invention will become clear from the following detailed description, given purely by way of non-limiting example with reference to the appended drawing, which is a diagram, partially in block form, showing an embodiment of the apparatus according to the invention.

DETAILED DESCRIPTION OF THE INVENTION

In the drawing, a motor vehicle, for example, a car with four wheels 1 to 4, is generally indicated V. In particular the front (rear) wheels of the vehicle are indicated 1 and 2 (3 and 4).

A velocity sensor S1 to S4 is associated with each wheel of the motor vehicle V.

In the embodiment shown, each velocity sensor comprises a toothed wheel W associated with a respective wheel and rotatable therewith. A respective magnetic pick-up (P) associated with each toothed wheel W is connected to a respective input of an electronic processing unit EPU formed, for example, by a microprocessor.

A warning device, for example, an optical warning device, piloted by the processing unit EPU, is indicated 5. A manual control 6, the purpose of which will be described below, is also connected to the unit EPU.

An electrical sensor which can supply a signal indicative of the activated or de-activated condition of the braking system of the motor vehicle in operation is indicated S. In the embodiment illustrated, the sensor S is an electrical position sensor S associated with the brake pedal BP.

The sensor S is also connected to an input of the processing unit EPU.

In operation, when the motor vehicle V is in motion, the sensors S1 to S4 supply the processing unit EPU with respective velocity signals or data indicative of the angular velocities $\omega_1$ to $\omega_4$ of the wheels 1 to 4.

The unit EPU is arranged to calculate (for example, for each revolution or rotation of a wheel adopted as the reference wheel) the value adopted by a predetermined function of the ratio or of the difference between the product of the angular velocities of two diagonally opposed wheels and the product of the angular velocities of the other two wheels.

The function may have an expression, for example, such as:

$$f = \frac{\omega_1 \omega_4}{\omega_2 \omega_3} - 1 \tag{1}$$

or $$f' = \omega_1 \omega_4 - \omega_2 \omega_3 \tag{2}$$

If the four wheels of the motor vehicle are uniformly inflated, the functions f and f' given above adopt values substantially equal to 0.

The value of the function f or f' is advantageously calculated by the unit EPU as the mean of the values adopted by this function (for example) in the last one hundred wheel revolutions. It is thus a value calculated by a "movable" averaging operation.

The unit EPU is arranged to compare the value of the function f or f' with two different stored reference values.

A first reference value is the value adopted by the function f or f' at a calibration stage which is activated by the user of the motor vehicle by the operation of the control 6 which is constituted, for example, by a push-button on the dashboard. The calibration operation is carried out each time the tires of the motor vehicle are inflated to the nominal value, or each time one or more tires of the motor vehicle are replaced. After this tire-inflation or -replacement operation, the user activates the calibration of the apparatus which calculates the first reference value, for example, as the mean value adopted by the function f or f' over 1000 wheel revolutions. This reference value is stored in the unit EPU.

The unit EPU is also arranged to acquire and store a second reference value for the function f or f', this value being up-dated or redefined automatically for each departure or trip of the motor vehicle. The second reference value is determined, for example, as the mean value of the function f or f' over 1000 wheel revolutions upon each departure or trip of the motor vehicle.

Each time the motor vehicle is started, after calculating and storing the aforementioned reference value, the unit EPU calculates, using the movable averaging operation mentioned above, the value adopted by the function f or f' for each wheel revolution and compares this value with the first and second reference values.

When the difference between the actual calculated value of the function f or f' and the first or second reference value exceeds a respective predetermined value, the unit EPU sends an activation signal to the warning device 5, indicating to the user of the motor vehicle the (at least potential) situation of the presence of a partially deflated tire.

The unit EPU is advantageously also arranged to process the wheel-velocity signals or data in order to calculate the values of a first index in accordance with a predetermined function of the changes in the relative rolling radius of each wheel and to generate a warning signal when the difference between the calculated value of the index and a predetermined reference value exceeds a predetermined level.

For this purpose, if, for example, the left-hand rear wheel 3 is adopted as the reference wheel, the relative rolling radius of each wheel, that is, their rolling radii relative to the rolling radius of the reference wheel can be defined:

$$I_1 = \frac{R_1}{R_3}, I_2 = \frac{R_2}{R_3}, I_3 = 1, I_4 = \frac{R_4}{R_3} \quad (3)$$

The relative rolling radii $I_i$ can be calculated by the unit EPU on the basis of the angular velocities of the four wheels detected by the sensors S1 to S4:

$$I_1 \simeq \frac{\omega_3}{\omega_1}, I_2 \simeq \frac{\omega_3}{\omega_2}, I_3 = 1, I_4 \simeq \frac{\omega_3}{\omega_4}. \quad (4)$$

The value adopted by the relative rolling radius of each wheel during each calibration stage mentioned above, that is, each stage immediately following the re-inflation or replacement of one or more tires of the vehicle, will be indicated $I^*_i$ below (wheel $I_i$, where i=1 ... 4).

The rolling radius $R_i$ at any time can be expressed as follows:

$$R_i = R^*_i - \Delta R_i \quad (5)$$

in which $R^*_i$ is the rolling radius which the wheel had during the last calibration operation and $\Delta R_i$ is the change in the rolling radius of the wheel relative to its value when the last calibration operation took place.

If the wheel 3 is adopted as the reference wheel, the change $\Delta R_i$ in the rolling radius can be expressed as follows:

$$\Delta R_i = R^*_3(I^*_i - I_i) + I_i \Delta R_3 \quad (6)$$

In a motor vehicle having uniformly inflated tires, a change in the load acting on the motor vehicle and hence in the load $\Delta f_i$ bearing on each wheel causes a change $\Delta R_i$ in the rolling radius thereof. It will be assumed below that there is a linear relationship between a change $\Delta f_i$ in load and the corresponding change $\Delta R_i$ in the rolling radius.

The force of the load acting on each wheel, and hence on each tire-suspension system, causes the height of the point of attachment of the suspension from the ground to change by a quantity $\Delta z_i$.

Upon the hypothesis mentioned above and if the hardnesses of the front tires are indicated $K_{pa}$, the hardnesses of the rear tires are indicated $K_{pp}$, the stiffnesses of the front suspension units are indicated $K_{sa}$ and the stiffnesses of the rear suspension units are indicated $K_{sp}$, the following relationship between $\Delta z_i$ and $\Delta R_i$ can easily be arrived at:

$$\Delta z_1 = \frac{K_{pa}}{K_{sa}} R^*_3(I^*_1 - I_1) + I_1 \frac{K_{pa}K_{sa}}{K_{sa}K_{pp}} \Delta z_3 \quad (7)$$

$$\Delta z_2 = \frac{K_{pa}}{K_{sa}} R^*_3(I^*_2 - I_2) + I_2 \frac{K_{pa}K_{sa}}{K_{sa}K_{pp}} \Delta z_3$$

$$\Delta z_4 = \frac{K_{pp}}{K_{sp}} R^*_3(I^*_4 - I_4) + I_4 \Delta z_3$$

Upon the assumption that the changes in the load acting on the motor vehicle are such as not to change its stiffness and the load changes are therefore such as to cause a rigid displacement of the motor vehicle, the following condition (a "coplanarity" condition) also applies to the displacements $\Delta z_i$:

$$(\Delta z_1 - \Delta z_2) - \frac{T_a}{T_p}(\Delta z_3 - \Delta z_4) = 0 \quad (8)$$

in which $T_a$ and $T_p$ are the front and rear tracks of the vehicle, respectively, that is, the distance between the centres of the front wheels and between the centres of the rear wheels, respectively.

If the expressions (7) are substituted for $\Delta z_i$ in equation (8), equation (8) can be rewritten in the following terms:

$$(I^*_1-I_1)-(I^*_2-I_2)+q(I^*_4-I_4)=0 \quad (9)$$

in which $$q = \frac{T_a}{T_p} \cdot \frac{K_{sa}K_{pp}}{K_{sp}K_{pa}} \quad (10)$$

The expression which figures on the first side of equation (9) given above is theoretically equal to zero and, in practice, substantially equal to zero when the changes in the relative rolling radii of the vehicle wheels are attributable essentially solely to changes in the load bearing on the motor vehicle.

When the value of this expression departs significantly from zero, the changes in the relative rolling radii are probably due to an anomalous change in the pressure of a tire, or of two tires situated on the same side of the vehicle.

The processing unit EPU is thus advantageously arranged to process the velocity signals or data relating to the four wheels and to calculate the value adopted by an index H in accordance with the expression which figures on the first side of equation (9) above:

$$H=(I^*_1-I_1)-(I^*_2-I_2)+q(I^*_4-I_4) \quad (11)$$

The unit EPU comprises memory means in which the values $T_a$, $T_p$, $K_{sa}$, $K_{pp}$, $K_{sp}$ and $K_{pa}$ relating to the specific motor vehicle have previously been stored.

The unit EPU can calculate the value of the coefficient q on the basis of these values.

The value adopted by the index H can then be calculated on the basis of the detected angular velocities of the four wheels, the relative rolling radii $I_i$ being calculable on the basis of equations (4) given above, and the values $I^*_i$ being the values of the relative rolling radii previously determined in the last calibration stage.

The value of the index H is advantageously calculated for each wheel revolution (possibly with digital filtering) and is compared with a predetermined threshold.

When the calculated value of H exceeds the threshold value, the unit EPU activates the alarm warning device 5.

The first two terms which appear in the expression for the index H given above together represent the difference between the changes in the relative rolling radii of the two wheels 1 and 2 belonging to the front axle of the vehicle.

In order to be able to detect anomalous lack of balance between the pressures of the tires of the front axle in comparison with those of the rear axle and vice versa, the value adopted by a further index, indicated D below and having the following expression, is advantageously considered:

$$D=(I^*_1-I_1)+(I^*_2-I_2)-q(I^*_4-I_4) \quad (12)$$

in which the various symbols retain the meanings defined above.

The first two terms of the expression for the index D represent the sum of the changes in the relative rolling radii of two wheels of the vehicle, in particular, of the wheels 1 and 2 belonging to the front axle.

The index D also adopts a value which, theoretically, is zero and, in practice, is substantially zero when the tire pressures adopt their normal values, that is when no excessive lack of balance occurs in particular between the pressures of the tires of the front axle in comparison with the pressures of those of the rear axle.

The unit EPU is advantageously arranged to calculate the value adopted by the index D, for example, for each wheel revolution, and to compare it with a predetermined threshold value, a warning signal being generated if this threshold value is exceeded.

In general, the calculated values of the functions f, f' and of the indices H and D are analyzed by comparison with the respective thresholds associated therewith only if some conditions are satisfied.

A first condition is the supply, by the sensor associated with the braking system, of a signal indicating that the braking system is not activated.

A further acceptance condition may be, for example, that the speed of the motor vehicle (derived in known manner from the signal supplied by the sensors S1 and S4) be greater than a predetermined value, for example, 25 km/h, and that the longitudinal and transverse accelerations of the vehicle (which can also be derived from the signals provided by the sensors S1 to S4) be below respective predetermined values.

A further acceptance condition is, for example, that the actual or apparent radius of curvature of the path of the motor vehicle be greater than a predetermined value, for example, of 1 km. This radius of curvature can be derived in known manner from an analysis of the angular velocity signals and data of the individual wheels.

Finally, a further acceptance condition may be that the percentage wheel slip be below a predetermined value, for example, of 1%.

The sensors S1 to S4 may advantageously be constituted by the sensors of an anskid kid (ABS) braking system with which the motor vehicle may be provided. In this case the unit EPU may also advantageously be constituted by the same control unit as that associated with the antis kid braking system, suitably arranged also to perform the functions described above.

Naturally, the principle of the invention remaining the same, the forms of embodiment and details of construction may be varied widely with respect to those described and illustrated purely by way of non-limiting example, without thereby departing from the scope of the present invention as defined in the appended claims.

What is claimed is:

1. A method of detecting the presence of at least one at least partially deflated tire on a motor vehicle with four wheels, comprising the steps of:

detecting angular velocity of each wheel and generating corresponding velocity signals or data, and processing the velocity signals or data in processing means arranged for calculating value of a predetermined function of the ratio or of the difference between the product of the angular velocities of two diagonally opposed wheels and the product of the angular velocities of the other two wheels, and generating a warning signal when difference between values of the function and of a first static reference value correspond to a normal inflation condition of the tires exceeds a predetermined value, or when difference between values of the function and of a second reference value determined upon each departure of the motor vehicle and corresponding to the actual inflation condition of the tires upon departure of the motor vehicle exceeds a predetermined value.

2. A method according to claim 1, comprising also the steps of:

processing the velocity signals or data in the processing means in order to calculate values of a first index in accordance with a predetermined function of the changes in the relative rolling radius of each wheel, and generating a warning signal when the difference between the calculated value of the index and of a predetermined reference value exceeds a predetermined level.

3. A method according to claim 2, wherein in order to calculate the index, the processing means are arranged to calculate a function of the difference in the changes in the relative rolling radii of two wheels of the vehicle belonging to the same axle, particularly the front axle.

4. A method according to claim 3, wherein the index is calculated in accordance with a function such as:

$$H=(I^*_1-I_1)-(I^*_2-I_2)+q(I^*_4-I_4) \quad (11)$$

in which $I_i$ (i=1 . . . 4) is the relative rolling radius calculated for each wheel, $I^*_i$ is a predetermined calibration value of the relative rolling radius for each wheel, and q is a coefficient predetermined in dependence on the values of the front and rear tracks of the vehicle and of the hardnesses of the tires and the stiffnesses of the suspension units of the motor vehicle.

5. A method according to claim 2, also comprising the steps of:

processing the velocity signals or data in the processing means in order to calculate values of a second index in accordance with a further predetermined function of the changes in the relative rolling radius of each wheel, and generating a warning signal when the difference between the calculated values of the second index and an associated predetermined reference value exceeds a predetermined level; the second index being calculated on the basis of a function of the sum of the changes in the relative rolling radii of two wheels of the vehicle belonging to the same axle, particularly the front axle.

6. A method according to claim 5, wherein the second index is calculated in accordance with a function such as:

$$D=(I^*_1-I_1)-(I^*_2-I_2)-q(I^*_4-I_4) \quad (12)$$

in which $I_i$ (i=1 . . . 4) is the relative rolling radius calculated for each wheel, $I^*_i$ is a predetermined calibration value of the relative rolling radius for each wheel, and q is a coefficient predetermined in dependence on the values of the front and rear tracks of the vehicle and of the hardnesses of the tires and the stiffnesses of the suspension units of the motor vehicle.

7. Apparatus for detecting the presence of at least one at least partially deflated tire on a motor vehicle with four wheels comprising:

sensor means for supplying velocity signals or data indicative of angular velocity of each wheel, and electronic processing means connected to the sensor means and arranged for calculating value of a predetermined function of the ratio or of the difference between the product of the angular velocities of two diagonally opposed wheels and the product of the angular velocities of the other two wheels, and generating a warning signal when difference between the values of function and of a first static reference value corresponding to a normal inflation condition of the tires exceeds a predetermined value, or when difference between values of the function and a second reference value determined upon each departure of the motor vehicle and corresponding to the actual inflation condition of the tires upon departure of the motor vehicle exceeds a predetermined value.

8. Apparatus according to claim 7, wherein the processing means are also arranged for:

processing the velocity signals or data in the processing means in order to calculate values of a first index in accordance with a predetermined function of the changes in the relative rolling radius of each wheel, and generating a warning signal when the difference between the calculated values of the index and of a predetermined reference value exceeds a predetermined level.

9. Apparatus according to claim 8, wherein in order to calculate the index, the processing means are arranged to calculate a function of the difference in the changes in the relative rolling radii of two wheels of the vehicle belonging to the same axle, particularly the front axle.

10. Apparatus according to claim 9, wherein the electronic processing means are arranged to calculate the index in accordance with a function such as:

$$H = (I^*_1 - I_1) - (I^*_2 - I_2) + q(I^*_4 - I_4) \tag{11}$$

in which $I_i$ (i=1 ... 4) is the relative rolling radius calculated for each wheel, $I^*_i$ is a predetermined calibration value of the relative rolling radius for each wheel, and q is a coefficient predetermined in dependence on the values of the front and rear tracks of the vehicle and of the hardnesses of the tires and of the stiffnesses of the suspension units of the motor vehicle.

11. Apparatus according to claim 7, wherein the processing means are also arranged for:

calculating values of a second index in accordance with a further predetermined function of the changes in the relative rolling radius of each wheel, and generating a warning signal when the difference between the calculated values of the second index and an associated predetermined reference value exceeds a predetermined level; the second index being calculated on the basis of a function of the sum of the changes in the relative rolling radii of two wheels of the vehicle belonging to the same axle, particularly the front axle.

12. Apparatus according to claim 11, wherein the processing means are arranged to calculate the second index in accordance with a function such as:

$$D = (I^*_1 - I_1) - (I^*_2 - I_2) - q(I^*_4 - I_4) \tag{12}$$

in which $I_i$ (i=1 ... 4) is the relative rolling radius calculated for each wheel, $I^*_i$ is a predetermined calibration value of the relative rolling radius for each wheel, and q is a coefficient predetermined in dependence on the values of the front and rear tracks of the vehicle and of the hardnesses of the tires and the stiffnesses of the suspension units of the motor vehicle.

* * * * *